United States Patent
Wan et al.

(10) Patent No.: US 9,426,246 B2
(45) Date of Patent: Aug. 23, 2016

(54) METHOD AND APPARATUS FOR PROVIDING CACHING SERVICE IN NETWORK INFRASTRUCTURE

(71) Applicant: EMC Corporation, Hopkinton, MA (US)

(72) Inventors: Lintao Wan, Shanghai (CN); Tianqing Wang, Shanghai (CN); Feng Guo, Shanghai (CN); Kai Yan, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 163 days.

(21) Appl. No.: 14/063,241

(22) Filed: Oct. 25, 2013

(65) Prior Publication Data

US 2014/0122637 A1    May 1, 2014

(30) Foreign Application Priority Data

Oct. 26, 2012   (CN) .......................... 2012 1 0440761

(51) Int. Cl.
*H04L 29/08* (2006.01)

(52) U.S. Cl.
CPC ....... *H04L 67/2842* (2013.01); *H04L 67/2871* (2013.01); *H04L 67/2852* (2013.01)

(58) Field of Classification Search
None
See application file for complete search history.

(56) References Cited

U.S. PATENT DOCUMENTS

| | | | | |
|---|---|---|---|---|
| 5,673,413 A * | 9/1997 | Deshpande | ......... | G06F 12/0817 710/107 |
| 5,878,218 A * | 3/1999 | Maddalozzo, Jr. | ..................... | G06F 17/30067 707/999.01 |
| 6,101,581 A * | 8/2000 | Doren | ................ | G06F 12/0804 711/141 |
| 6,105,108 A * | 8/2000 | Steely, Jr. | ........... | G06F 12/0811 711/118 |
| 6,202,126 B1 * | 3/2001 | Van Doren | ......... | G06F 12/0804 711/118 |
| 6,292,835 B1 * | 9/2001 | Huang | .............. | G06F 17/30902 707/999.201 |
| 6,563,517 B1 * | 5/2003 | Bhagwat | .......... | G06F 17/30905 375/E7.016 |
| 7,624,184 B1 * | 11/2009 | Aviani et al. | .................. | 709/227 |
| 2002/0156863 A1 * | 10/2002 | Peng | ............................. | 709/217 |
| 2003/0061372 A1 * | 3/2003 | Agarwalla et al. | ........... | 709/232 |
| 2006/0174155 A1 * | 8/2006 | Mansell | .............. | G06F 11/3696 714/5.11 |
| 2007/0022123 A1 * | 1/2007 | Marndi | ............. | G06F 17/30067 |
| 2007/0162701 A1 * | 7/2007 | Schlansker | ......... | G06F 12/0831 711/118 |
| 2008/0005121 A1 * | 1/2008 | Lam | .................. | G06F 17/30067 |
| 2008/0250210 A1 * | 10/2008 | Ash | ..................... | G06F 11/2033 711/141 |
| 2008/0256177 A1 * | 10/2008 | Boberg | ............... | H04L 67/1095 709/203 |
| 2009/0019227 A1 * | 1/2009 | Koski | ................. | G06F 17/3048 711/133 |

(Continued)

OTHER PUBLICATIONS

Open Flow v0.9 , Open Flow v0.9—Open Flow Wiki, 2011, 0.9, all pages.*

*Primary Examiner* — Ninos Donabed
(74) *Attorney, Agent, or Firm* — Krishnendu Gupta; Konrad Lee (57) ABSTRACT

A method and apparatus for providing caching service in network infrastructure. In an embodiment, there is provided a method for providing caching service in network infrastructure, comprising: in response to at least one application node accessing data in a storage node, caching a copy of the data in a cache server; in response to the at least one application node accessing the data in the storage node, obtaining an identifier indicating whether the data in the storage node is valid or not; and in response to the identifier indicating the data in the storage node is valid, returning the copy; wherein the at least one application node and the storage node are connected via the network infrastructure, and the cache server is coupled to a switch in the network infrastructure. In another embodiment of the present invention, there is provided an apparatus for providing caching service in network infrastructure.

12 Claims, 7 Drawing Sheets

(56) References Cited

U.S. PATENT DOCUMENTS

| | | | |
|---|---|---|---|
| 2009/0164689 A1* | 6/2009 | Luba | G06F 12/0831 710/305 |
| 2010/0100636 A1* | 4/2010 | Hegde | H04L 29/06027 709/231 |
| 2010/0153415 A1* | 6/2010 | Muntz | 707/758 |
| 2010/0161717 A1* | 6/2010 | Albrecht | H04L 67/2852 709/203 |
| 2011/0161335 A1* | 6/2011 | Dash et al. | 707/758 |
| 2011/0203000 A1* | 8/2011 | Bacus | G06F 21/10 726/26 |
| 2011/0265075 A1* | 10/2011 | Lee | 717/171 |
| 2012/0023287 A1* | 1/2012 | Fukuda | G06F 12/0868 711/103 |
| 2012/0110656 A1* | 5/2012 | Santos | H04L 63/0263 726/13 |
| 2013/0031060 A1* | 1/2013 | Lowery et al. | 707/689 |
| 2013/0304823 A1* | 11/2013 | Sato | 709/204 |

* cited by examiner

METHOD AND APPARATUS FOR PROVIDING CACHING SERVICE IN NETWORK INFRASTRUCTURE

BACKGROUND

Embodiments of the present invention relate to caching, and more specifically, to a method and apparatus for providing caching service in network infrastructure.

The development of network technology has provided variety of conveniences for people's work and life, and more and more applications involve data access via a network. The response speed in data access via a network becomes a critical factor that affects user experience. How to provide faster and more stable data transmission service via network infrastructure is always a research focus of network technology.

Caching technology has been used to improve the speed in accessing a network. However, with respect to a specific network application, current technical solutions have to separately develop, or specially develop or deploy dedicated hardware and software products so as to cache data that was previously obtained via a network. Such development and deployment jobs have poor reusability and will impose a heavy burden on manpower and material resources.

SUMMARY

Therefore, it is desired to develop and achieve a technical solution for improving caching service in network infrastructure. It is desired that the technical solution can be compatible with existing network applications while keeping the structure of existing network infrastructure unchanged as much as possible. Further, it is desired that the technical solution is scalable, i.e., will gradually be extended with the growth of network infrastructure. To this end, the embodiments of the present invention provide a method and apparatus for providing caching service in network infrastructure.

In one embodiment of the present invention, there is provided a method for providing caching service in network infrastructure, comprising: in response to at least one application node accessing data in a storage node, caching a copy of the data in a cache server; in response to the at least one application node accessing the data in the storage node, obtaining an identifier indicating whether the data in the storage node is valid or not; and in response to the identifier indicating the data in the storage node is valid, returning the copy; wherein the at least one application node and the storage node are connected via the network infrastructure, and the cache server is coupled to a switch in the network infrastructure.

In one embodiment of the present invention, each of the at least one application node and the storage node are connected via a switch in the network infrastructure.

In one embodiment of the present invention, the switch is a switch that is directly connected with the at least one application node.

In one embodiment of the present invention, there is provided an apparatus for providing caching service in network infrastructure, comprising: a caching module configured to, in response to at least one application node accessing data in a storage node, cache a copy of the data in a cache server; an obtaining module configured to, in response to the at least one application node accessing the data in the storage node, obtain an identifier indicating whether the data in the storage node is valid or not; and a returning module configured to, in response to the identifier indicating the data in the storage node is valid, return the copy; wherein the at least one application node and the storage node are connected via the network infrastructure, and the cache server is coupled to a switch in the network infrastructure.

In one embodiment of the present invention, each of the at least one application node and the storage node are connected via a switch in the network infrastructure.

In one embodiment of the present invention, the switch is a switch that is directly connected with the at least one application node.

The caching service provided based on the embodiments of the present invention may be implemented in network infrastructure, and the implementation is transparent to users. A network application can achieve a faster speed in data access simply by performing data access via the network as usual.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
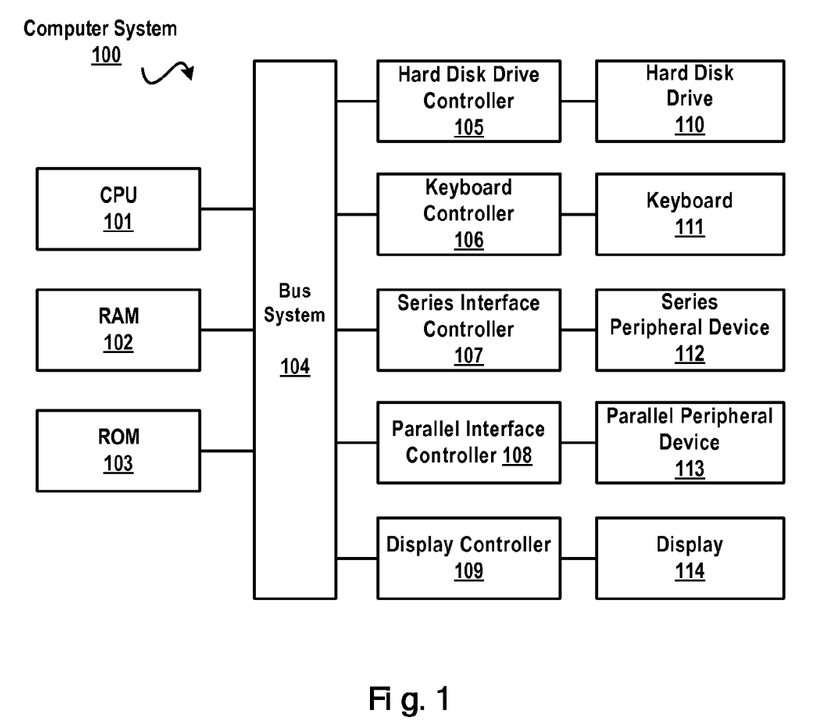
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
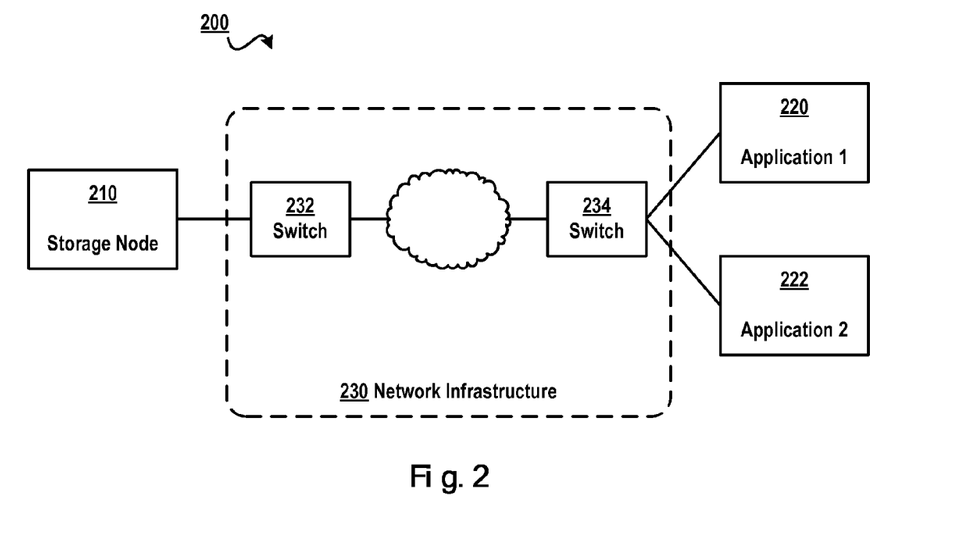
FIG. 2 schematically illustrates a block diagram of a network environment.

FIG. 2 schematically illustrates a block diagram 200 of a network environment. In summary, network environment may comprise two types of nodes: a storage node 210 and an application node (for example, may comprise an application node 1 220 and an application node 2 222, etc.). Here, storage node 210 represents a data repository or a typical block/file storage system, which may, for example, provide the data for various applications. In the context of the present invention, the storage node may be regarded as the data provider. Although FIG. 2 illustrates only one storage node 210, in a real network environment more storage nodes may be comprised. The application node is typically a server which has network applications running thereon, which is used for doing some computation work on the data. In the context of the present invention, the application node may be regarded as the data consumer.

Storage node 210 and application nodes (e.g., 220 and 222) are connected through network infrastructure 230. A dotted block 230 illustrates network infrastructure that comprises a plurality of switches. Although only switches 232 and 234 are illustrated in this figure, network infrastructure 230 may further comprise other switches.

In order to accelerate the speed of data access, there has been proposed a solution capable of designing and developing caching function with respect to a specific network application. However, this solution has such a drawback that design and development should be implemented separately for each network application desiring to use a caching function. For example, if 10 network applications are run on application node 1 220, then 10 suites of independent caching solutions have to be developed.

Another method is to use Content Delivery Networks (CDNs), whose basic idea is to avoid as much network bottlenecks as possible that might affect the speed and stability of data transmission, and to provide faster and more stable data transmission. By separately deploying servers that support CDNs to form a layer of virtual network above the existing network infrastructure, CDNs can redirect a user request to an appropriate server in real time according to network traffic, connections, load conditions, distances to the user, response times and other comprehensive information of various nodes. Although CDNs can improve the data access efficiency to a certain extent, CDN operators have to input a large amount of manpower and material resources for deploying various devices in a content delivery network.

Figure 3:
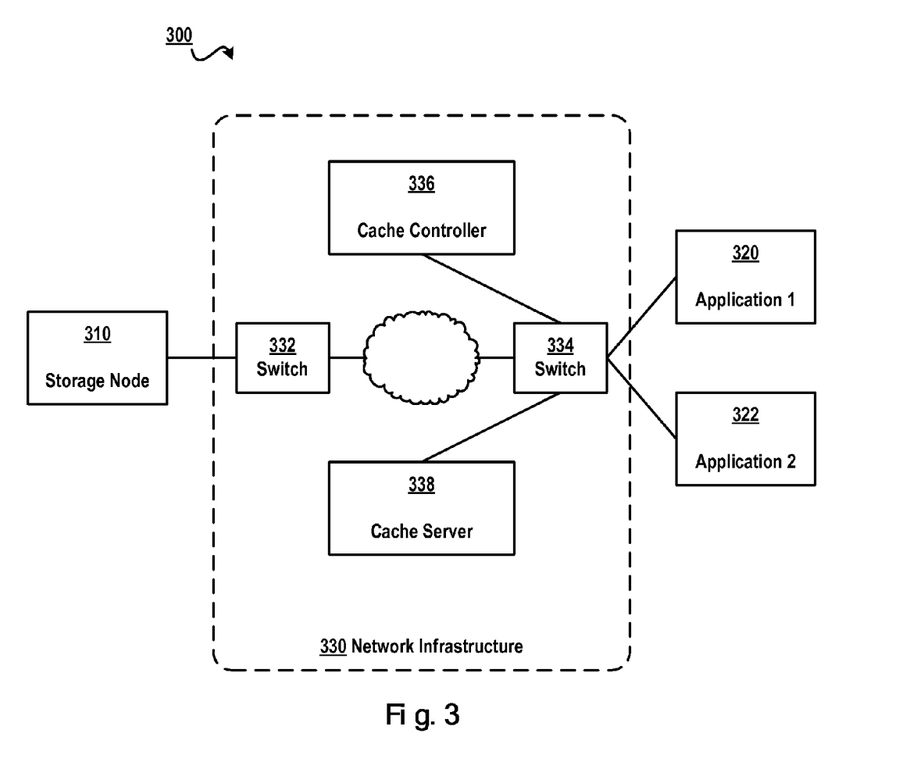
FIG. 3 schematically illustrates an architectural view of providing caching service in network infrastructure according to one embodiment of the present invention.

In view of these problems in the above solutions, the embodiments of the present invention propose a technical solution for providing caching service in network infrastructure. FIG. 3 schematically illustrates an architectural view 300 of providing caching service in network infrastructure according to one embodiment of the present invention.

Specifically, a cache server 338 may be coupled to a switch (e.g., a switch 334 that is directly connected to various application nodes) that is connected to an application node (e.g., application node 320 or 322). In the embodiments of the present invention, the switch that is directly connected to an application node may be called edge switch. Since the edge switch is at a distance of only "1 hop" from the application node, if "hot" data (i.e., data being accessed frequently) is directly cached at the edge switch, the data access efficiency can be improved greatly.

However, since the storage capacity of the switch is rather limited, where "hot" data cannot be stored at the edge switch, a cache server may be coupled to the edge switch, and is used to store "hot" data so as to achieve the objective of improving the data access efficiency. Note although the term "couple" is used in the context of the present invention, to "couple" does not exclude the circumstance in which the storage space of the edge switch is directly used as a cache.

In addition, a cache controller 336 is connected to edge switch 334 for controlling actions of edge switch 334 and cache server 338 while providing caching service. Cache controller 336 may be used to configure, monitor and manage edge switch 334 (although only one edge switch 334 is illustrated in FIG. 3, more edge switches may exist), so that cache controller 336 may perform control based on a rule when requested data passes through the switch. Thus, cache server 338 may locally cache previously requested data, and when the same or a different application node requests the same data once again, a copy cached in cache server 338 may be directly sent to that application node.

Note the present invention proposes a technical solution for providing caching service in network infrastructure. Based on the extension of the existing network infrastructure, this solution provides caching service without arranging a suite of separate network architecture just as the existing CDN. With the method and apparatus of the present invention, a "caching as a service" technical solution may be implemented in network infrastructure, and the service of providing such a common function as caching service may be delivered to network infrastructure, thereby simplifying business logic of network applications.

In addition, the embodiment of the present invention may be extended with the change of network infrastructure or application nodes. For example, when other application node is connected to the network infrastructure as illustrated in FIG. 3, a new cache server may be coupled to an edge switch to which the application node is directly connected, and the edge switch and the cache server are controlled using cache controller 326. In this manner, network infrastructure 330 may be gradually extended so that caching service is provided to various application nodes in network infrastructure 330.

In one embodiment of the present invention, there is provided a method for providing caching service in network infrastructure, comprising: in response to at least one application node accessing data in a storage node, caching a copy of the data in a cache server; in response to the at least one application node accessing the data in the storage node, obtaining an identifier indicating whether the data in the storage node is valid or not; and in response to the identifier indicating the data in the storage node is valid, returning the copy; wherein the at least one application node and the storage node are connected by the network infrastructure, and the cache server is coupled to a switch in the network infrastructure.

Figure 4:
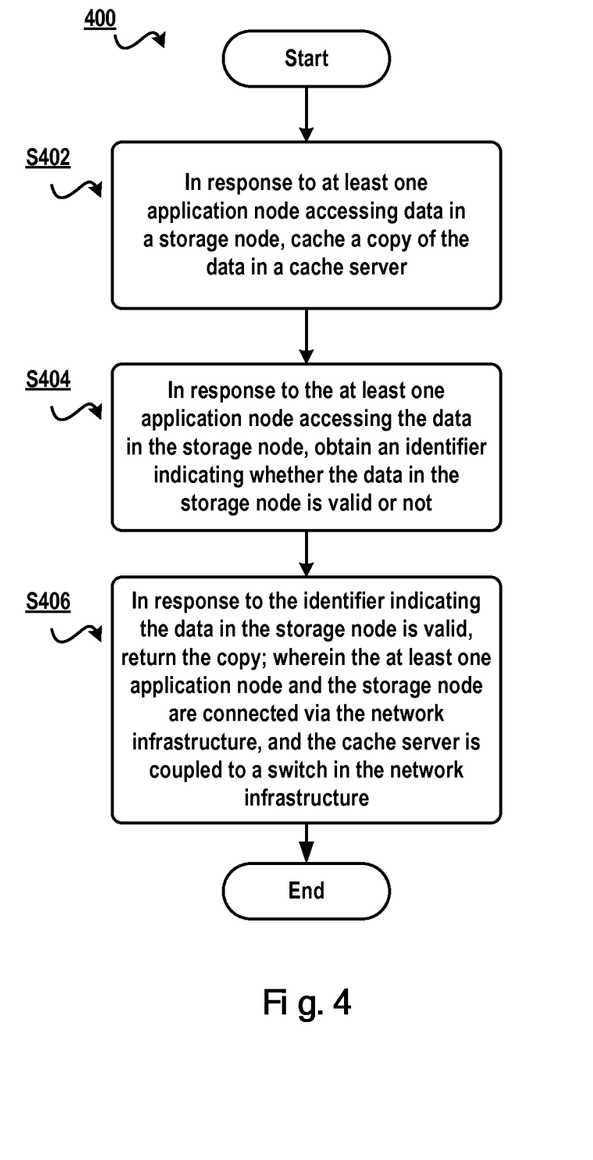
FIG. 4 schematically illustrates a flowchart of a method for providing caching service in network infrastructure according to one embodiment of the present invention.

FIG. 4 schematically illustrates a flowchart 400 of a method for providing caching service in network infrastructure according to one embodiment of the present invention. First of all, in step S402, in response to at least one application node accessing data in a storage node, a copy of the data is cached in a cache server. This step may represent a process that an application in the application node requests to access the data in the storage node after being started.

Take FIG. 3 as an example, application node 1 320 accesses data in storage node 310 via network infrastructure 330. At this point, an access request from application node 1 320 is routed first to switch 334 (in this embodiment, switch 334 is a switch that is coupled to cache server 330 and controlled by cache controller 336) and then to storage node 310 via switch 332. In response to the access request, storage node 310 returns data to switch 334. At this point, switch 334 not only returns the requested data to application node 1 320 but also stores a copy of the requested data in cache server 338 (or in switch 334 directly).

The purpose of storing a data copy is that when application node 1 320 (or other application node, e.g., application node 2 322) requests the same data once again, the data may be returned directly from cache server 338 without passing through a series of network equipment between switch 334 and storage node 310. In this manner, caching service may be provided in network infrastructure 330 through minor modifications to network infrastructure 330. Moreover, the distance from cache server 338 to various application nodes (e.g., application nodes 320 and 332) is only "2 hops." With the embodiments of the present invention, the possibility of retransmission and errors occurring in the transmission course are reduced while shortening the data transmission path; thus, the speed of response to data access requests may be accelerated greatly, and further high-efficiency caching service may be provided.

In step S404, in response to the at least one application node accessing the data in the storage node, an identifier indicating whether the data in the storage node is valid or not is obtained. This step serves a purpose of determining whether the copy in the cache server is still valid or not. If the data in the storage node has been updated, then the copy stored in the cache server turns to invalid data and cannot be used to respond to the data access request; otherwise, the copy in the cache server is still valid.

In step S406, in response to the identifier indicating the data in the storage node is valid, the copy is returned. In this step, the copy of the requested data is directly returned from the cache server to the application node. Note the application node requesting data access in step S404 may be the same as or different from the application node requesting data access in step S402. The present invention does not care which application node requests data, but cares whether specific data has been previously requested by a node and whether the specific data has been updated in the storage node.

In the embodiment described in steps S402-S406, the at least one application node and the storage node are connected by the network infrastructure, and the cache server is coupled to a switch in the network infrastructure. The network infrastructure provides physical supports for data communication between the application node and the storage node, and the cache server is coupled to a switch in the network infrastructure and may act as a part of the network infrastructure.

In this manner, the network infrastructure itself may provide caching service based on the embodiments of the present invention. A provider of the application node no longer needs to perform hardware and software configuration separately for each application running on the application node, and also does not need to additionally pay for service of a CDN provider. By integrating caching service to the network infrastructure, it is possible to significantly reduce the manpower and material resources which a network service provider invests to support caching.

In one embodiment of the present invention, each of the at least one application node and the storage node are connected via a switch in the network infrastructure. Note this switch is a switch on the communication path between each of the at least one application node and the storage node. When the switch is located on the communication path between the storage node and the application node, the copy of the data in the storage node may be transmitted to the cache server that is coupled to the switch, for use during subsequent data access.

In one embodiment of the present invention, the switch is a switch that is directly connected to the at least one application node. Note in order to reduce the hops between the cache server and the at least one application node, the cache server may be coupled to a switch that is directly connected to the application node. At this point, there are only 2 hops between the cache server and the application node, so that it is ensured that the data response time is as short as possible.

In one embodiment of the present invention, there is further comprised: in response to the identifier indicating the data in the storage node is invalid, returning updated data in the storage node; and caching a copy of the updated data in the cache server. In this embodiment, if the data in the storage node has been updated, then the copy in the cache server turns invalid, and updated data needs to be returned from the storage node to the application node via various switches on the communication path. Furthermore, in order to accelerate the speed of potential data access, the copy of the updated data may be cached in the cache server (for example, sent from the switch to the cache server).

According to the embodiments of the present invention, various approaches may be used for judging whether the data in the storage node has been updated or not and for setting an identifier. For example, it is possible to periodically query the storage node whether a copy of specific data has been updated or not; or the storage node may notify the cache server when data stored therein is updated.

In one embodiment of the present invention, there is further comprised: storing a source address of the data in the cache server. The purpose of storing a source address is that the cache server may send a message to the source address for query. In one embodiment of the present invention, the identifier is set as below: periodically sending a query request to the source address so as to query whether the data in the storage node has been updated or not; and in response to the data in the storage node having been update, setting the identifier as invalid. If the data in the storage node has been updated, the identifier is set as invalid, so that the data is returned from the storage node when an application node requests the same data once again. Those skilled in the art may define a time interval of the query period, which is not detailed here.

In one embodiment of the present invention, the identifier is set as below: in response to receiving an update notification from the storage node, setting the identifier as invalid. In this embodiment, the storage node may notify all switches associated with the updated data in the storage node that the copy in the cache server is invalid. Then, the switch may ignore the copy in the cache server and requests the storage node for the updated data.

In addition, where specific data in the storage node is requested frequently, in response to receiving an update notification from the storage node, the data in the storage node is updated and the identifier is set as valid. In this manner, the speed of response to subsequent access requests will be improved significantly.

Figure 5:
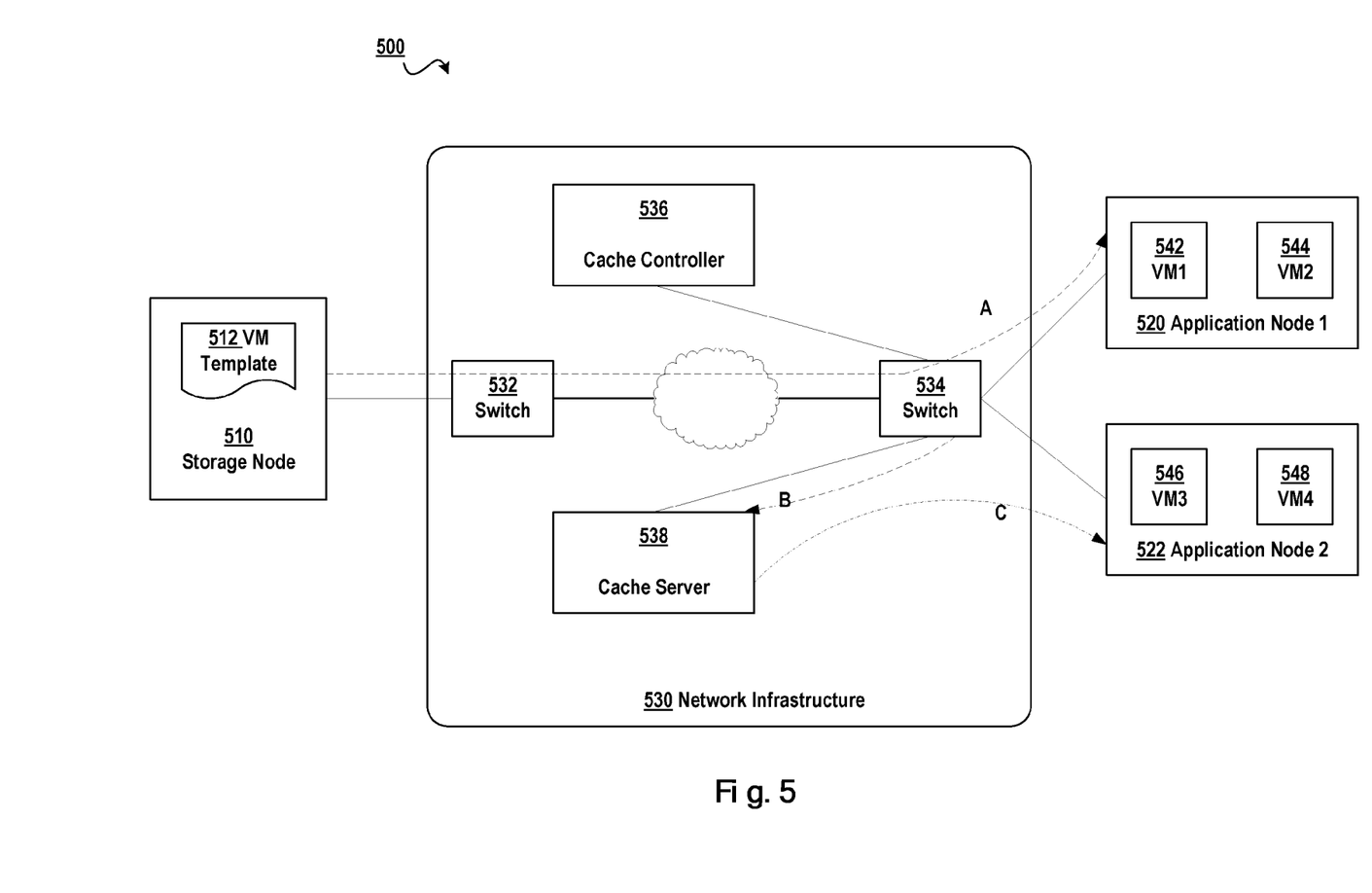
FIG. 5 schematically illustrates a block diagram of a process of data access based on caching service provided by network infrastructure according to one embodiment of the present invention.

FIG. 5 schematically illustrates a block diagram 500 of a process of data access based on caching service provided by network infrastructure according to one embodiment of the present invention. In FIG. 5, a plurality of virtual machine (VM) instances VM1 542, VM2 544, VM3 546 and VM4 548 are running on an application node 1 520 and an application node 2 522, respectively, and all these instances are booted based on a VM template 512 in a storage node 510.

For example, when VM1 542 is running on application node 1 520, application node 1 520 requests storage node 510 for VM template 512 via network infrastructure 530, and then storage node 510 returns VM template 512 through switches 532 and 534 on a communication path, and switch 534 sends the VM template to application node 1 520 for booting virtual machine 1 542 (as illustrated by dotted arrow A). In addition, switch 534 further sends the VM template to a cache server 538 (as illustrated by dotted arrow B), at which point the VM template is cached in cache server 538 for subsequent use. Afterwards, when other VM instance is booted, the VM template may be directly returned from cache server 538 near the application node.

Since the VM template will not be updated for a long time after the completion of development, with the embodiment illustrated in FIG. 5, it is unnecessary to repeatedly request the storage node for the same VM template, thereby greatly improving the speed of response to data access requests. Although the data access process based on the embodiments of the present invention is set forth in conjunction with such a concrete technique as VM instances in FIG. 5, those skilled in the art would appreciate that the data copy cached in the cache server may include, without limitation to, text, images, audio, video and other types of data files or a combination of multiple data files, so long as the data files or combination may be cached in the cache server.

In one embodiment of the present invention, the method is implemented based on the OpenFlow protocol. OpenFlow is a communication protocol that gives access to the forwarding plane of a network switch or router over the network. In simpler terms, OpenFlow allows the path of network packets through the network of switches to be determined by software running on multiple routers.

OpenFlow provides a convenient technical means for controlling data forwarding between switches, servers and various nodes. Based on OpenFlow, the present invention supports a more intelligent network infrastructure and provides caching service to applications running on various nodes. By moving the function of caching service from the application level to the network level, it is possible to develop, deploy and manage distributed systems more simply and conveniently.

Furthermore, a rule based on which caching service is provided may be set (for example, the rule may be provided in the cache server). For example, an "ON/OFF" function may be set so as to activate or disable caching service; an approach may be set as to how to judge whether the copy cached in the cache server is valid or not; it may be defined for which type of data caching service is provided (or not provided); different service may be provided for different application nodes, etc.

In one embodiment of the present invention, when caching service in the network infrastructure is activated, a special mark may be added to a network packet to which caching service is desired to be provided, so as to indicate the packet is "cacheable." Moreover, a policy may be set for the cache server, so as to cache the "hottest" data in the cache server based on factors like the frequency of data access.

Figure 6A:
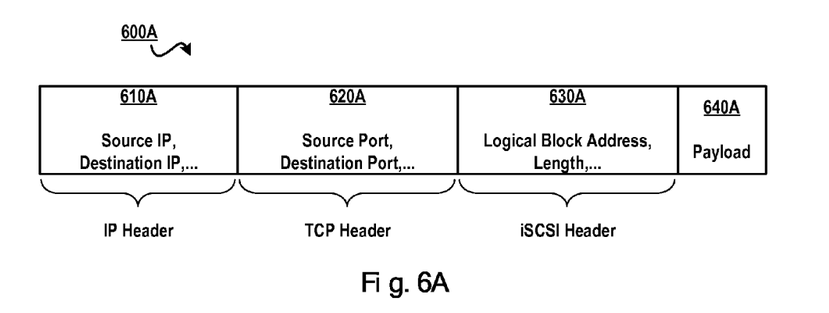
FIGS. 6A-C schematically illustrate a block diagram of packets transmitted according to one embodiment of the present invention.
Figure 6B:
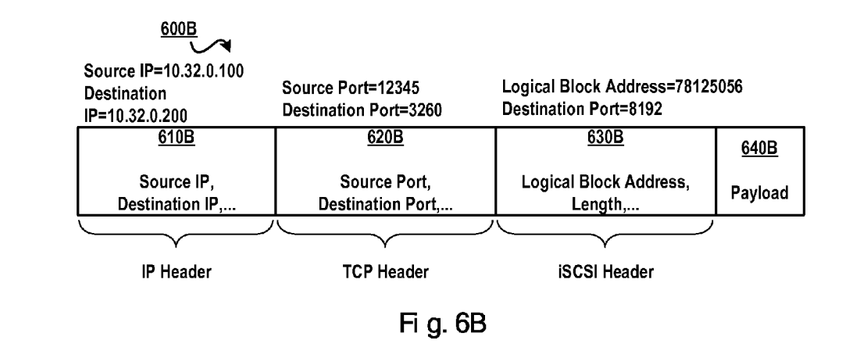
Figure 6C:
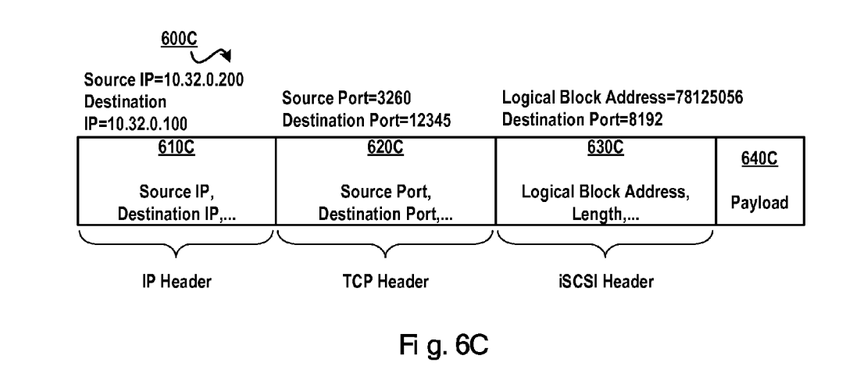

FIG. 6A-C schematically illustrates a block diagram 600 of packets transmitted according to one embodiment of the present invention. Hereinafter, the iSCSI protocol is taken as an example only for illustrating how to transmit packets between various network entities. The iSCSI protocol is a protocol that uses the traditional TCP/IP protocol to package the SCSI (Small Computer System Interface) for data transmission. FIG. 6A schematically a block diagram 600A of a network packet format. Payload 640A is packaged in an iSCSI packet that is packaged in a TCP packet, and the TCP packet is included in an IP packet. An IP header comprises a source IP address, a destination IP address, etc.; a TCP header comprises a source port number, a destination port number, etc.; and an iSCSI header comprises a logical block address, a data length and other information.

When an edge switch is monitored and managed based on OpenFlow, a cache controller may be notified when a network packet passes through the edge switch, and the edge switch is caused to analyze critical information on various layer protocols in the network packet. For example, the IP address of an application node where an application is located is 10.32.0.100, and the IP address of a storage node is 10.32.0.200; when the application requests to access data in the storage node, the edge switch receives a request which the application node sends to the storage node (content of the request is as illustrated in FIG. 6B). In response to receipt of the request, the storage node returns requested data to the application on the application node. At this point, the edge switch will receive a "response" as illustrated in FIG. 6C.

In the embodiment of the present invention, two network data packets as illustrated in FIGS. 6B and 6C may be monitored, and it may be derived through analysis that the two network data packets is a pair of request/response. When a response is detected, the edge switch is instructed to send a copy of the response to the cache server. Next, the cache server can cache the copy of the requested data and record relevant information (e.g., a source address, a logical block address and size, and other information).

When other request for the same data passes through the edge switch, if it is found that a copy (valid copy) of the requested data is already cached in the cache server, then the copy may be immediately sent to that application. In this manner, it is possible to reduce the traffic on the network transmission path, the load on the storage node and the network infrastructure, and improve the performance of applications at the same time.

In one embodiment of the present invention, the methods described above may be implemented in the cache controller and the cache server.

Figure 7:
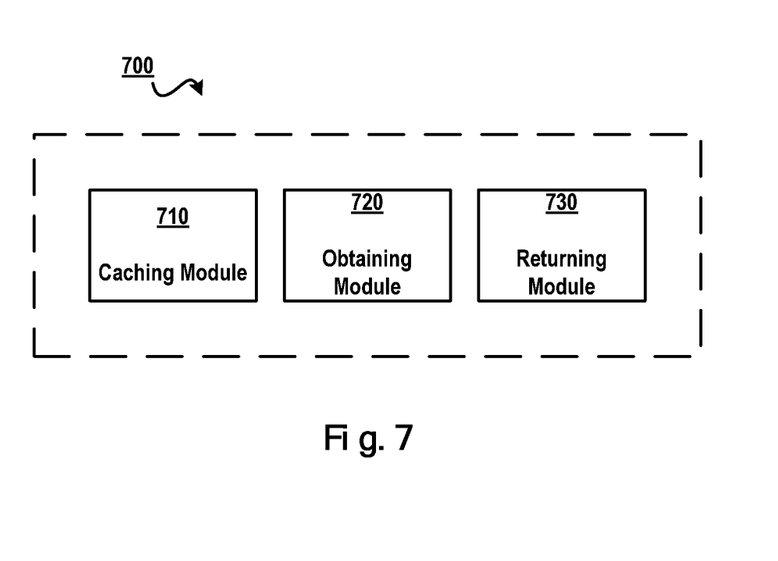
FIG. 7 schematically illustrates a block diagram of an apparatus for providing caching service in network infrastructure according to one embodiment of the present invention.

FIG. 7 schematically illustrates a block diagram 700 of an apparatus for providing caching service in network infrastructure according to one embodiment of the present invention. As illustrated in FIG. 7, the apparatus comprises: a caching module 710 configured to, in response to at least one application node accessing data in a storage node, cache a copy of the data in a cache server; an obtaining module 720 configured to, in response to the at least one application node accessing the data in the storage node, obtain an identifier indicating whether the data in the storage node is valid or not; and a returning module 730 configured to, in response to the identifier indicating the data in the storage node is valid, return the copy; wherein the at least one application node and the storage node are connected via the network infrastructure, and the cache server is coupled to a switch in the network infrastructure.

In one embodiment of the present invention, each of the at least one application node and the storage node are connected via a switch in the network infrastructure.

In one embodiment of the present invention, the switch is a switch that is directly connected with the at least one application node.

In one embodiment of the present invention, there is further comprised: an update module configured to, in response to the identifier indicating the data in the storage node is invalid, return updated data in the storage node; and cache a copy of the updated data in the cache server.

In one embodiment of the present invention, there is further comprised: a storage module configured to store a source address of the data in the cache server.

In one embodiment of the present invention, obtaining module 720 comprises: a first obtaining module configured to periodically send a query request to the source address for querying whether the data in the storage node has been updated or not; and in response to the data in the storage node having been updated, set the identifier as invalid.

In one embodiment of the present invention, obtaining module 720 comprises: a second obtaining module configured to, in response to receipt of an update notification from the storage node, set the identifier as invalid.

In one embodiment of the present invention, the apparatus is implemented based on the OpenFlow protocol.

In various embodiments of the present invention, the providing caching service in network infrastructure has the following advantages: transparent caching service is provided for applications, which will save various overheads for designing and implementing a caching functionality for specific applications; it is easy and flexible to manage the service (e.g., with a central cache controller), at which point what users need to do is only defining the rules on which the service providing is based; the response performance of an application is performed by providing cached data at a position data closer to the application; furthermore, the embodiments reduce unnecessary traffic in the network infrastructure, since there is no need to transmit data from the storage node to the application node each time.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method, on one or more processors, for providing caching service in network infrastructure using a cache controller, a cache server, and a switch, comprising:
   in response to at least one application node accessing data in a storage node, caching a copy of the data in the cache server;
   wherein the cache controller is enabled to direct the switch to send the copy of the data to the cache server;
   wherein the cache controller and the cache server are enabled to be deactivated without impact to the application node accessing data in the storage node;
   in response to the at least one application node accessing the data in the storage node, obtaining an identifier indicating whether the data in the storage node is valid or not;
   in response to the identifier indicating the data in the storage node is valid, returning the copy;
   wherein the identifier is set through the steps of:
      periodically sending a query request to the source address for querying whether the data in the storage node has been updated or not; and
      in response to the data in the storage node having been updated, setting the identifier as invalid;
   wherein the at least one application node and the storage node are connected via the network infrastructure, and the cache server is coupled to a switch in the network infrastructure; and
   storing a source address of the data in the cache server.

2. The method according to claim 1, wherein each of the at least one application node and the storage node are connected via a switch in the network infrastructure.

3. The method according to claim 2, wherein the switch is a switch that is directly connected with the at least one application node.

4. The method according to claim 1, further comprising: in response to the identifier indicating the data in the storage node is invalid,
   returning updated data in the storage node; and
   caching a copy of the updated data in the cache server.

5. The method according to claim 1, wherein the identifier is set through the step of: in response to receipt of an update notification from the storage node, setting the identifier as invalid.

6. The method according to claim 1, wherein the method is implemented based on OpenFlow protocol.

7. An system, comprising:
   a network infrastructure using a cache server, a cache controller, and a switch; and
   computer-executable program logic encoded in memory of one or more computers enabled to manage providing caching services using the network infrastructure, wherein the computer-executable program logic is configured for the execution of:
      in response to at least one application node accessing data in a storage node, caching a copy of the data in the cache server;
      wherein the cache controller is enabled to direct the switch to send the copy of the data to the cache server;
      wherein the cache controller and the cache server are enabled to be deactivated without impact to the application node accessing data in the storage node;
      in response to the at least one application node accessing the data in the storage node, obtaining an identifier indicating whether the data in the storage node is valid or not; and
      in response to the identifier indicating the data in the storage node is valid, returning the copy;
      wherein the identifier is set through the steps of:
         periodically sending a query request to the source address for querying whether the data in the storage node has been updated or not; and
         in response to the data in the storage node having been updated, setting the identifier as invalid;
      wherein the at least one application node and the storage node are connected via the network infrastructure, and the cache server is coupled to a switch in the network infrastructure; and
      storing a source address of the data in the cache server.

8. The system according to claim 7, wherein each of the at least one application node and the storage node are connected via a switch in the network infrastructure.

9. The system according to claim 8, wherein the switch is a switch that is directly connected with the at least one application node.

10. The system according to claim 7, wherein the computer-executable program logic is further configured for the execution of:
   in response to the identifier indicating the data in the storage node is invalid, returning updated data in the storage node; and
   caching a copy of the updated data in the cache server.

11. The system according to claim 7, wherein the computer-executable program logic is further configured for the execution of:
   in response to receipt of an update notification from the storage node, setting the identifier as invalid.

12. The system according to claim 7, wherein communication with the network infrastructure utilizes an Open Flow protocol.

\* \* \* \* \*